United States Patent
Foster et al.

(10) Patent No.: US 6,925,651 B2
(45) Date of Patent: Aug. 2, 2005

(54) METHOD AND PROCESSOR ENGINE ARCHITECTURE FOR THE DELIVERY OF AUDIO AND VIDEO CONTENT OVER A BROADBAND NETWORK

(75) Inventors: Mark J. Foster, Palo Alto, CA (US); Theodore Calderone, San Carlos, CA (US)

(73) Assignee: Agile TV Corporation, Menlo Park, CA (US)

( * ) Notice: Subject to any disclaimer, the term of this patent is extended or adjusted under 35 U.S.C. 154(b) by 765 days.

(21) Appl. No.: 09/740,684

(22) Filed: Dec. 18, 2000

(65) Prior Publication Data
US 2002/0078462 A1 Jun. 20, 2002

Related U.S. Application Data
(60) Provisional application No. 60/210,440, filed on Jun. 8, 2000.

(51) Int. Cl.[7] .............................................. H04N 7/173
(52) U.S. Cl. ....................................................... 725/105
(58) Field of Search ............................... 725/86, 90–91, 725/98–100, 105, 110, 114–117

(56) References Cited

U.S. PATENT DOCUMENTS

| | | | | |
|---|---|---|---|---|
| 5,361,091 A | * | 11/1994 | Hoarty et al. ................ | 725/119 |
| 5,422,674 A | * | 6/1995 | Hooper et al. ......... | 375/240.15 |
| 5,461,679 A | * | 10/1995 | Normile et al. ............. | 382/304 |
| 5,949,490 A | * | 9/1999 | Borgwardt et al. .... | 375/240.05 |
| 6,005,561 A | * | 12/1999 | Hawkins et al. ......... | 715/500.1 |
| 6,014,694 A | * | 1/2000 | Aharoni et al. ............. | 709/219 |
| 6,052,555 A | * | 4/2000 | Ferguson .................... | 725/116 |
| 6,122,400 A | * | 9/2000 | Reitmeier ................... | 382/166 |
| 6,163,795 A | * | 12/2000 | Kikinis ....................... | 709/203 |
| 6,351,471 B1 | * | 2/2002 | Robinett et al. ............ | 370/468 |
| 6,654,958 B1 | * | 11/2003 | Roberts et al. ............. | 725/129 |

* cited by examiner

*Primary Examiner*—Chris Kelley
*Assistant Examiner*—Dave Czekaj
(74) *Attorney, Agent, or Firm*—Glenn Patent Group; Michael A. Glenn

(57) ABSTRACT

A method and processor architecture that implements the delivery of compressed digital video and audio content over a broadband network is disclosed.

29 Claims, 18 Drawing Sheets

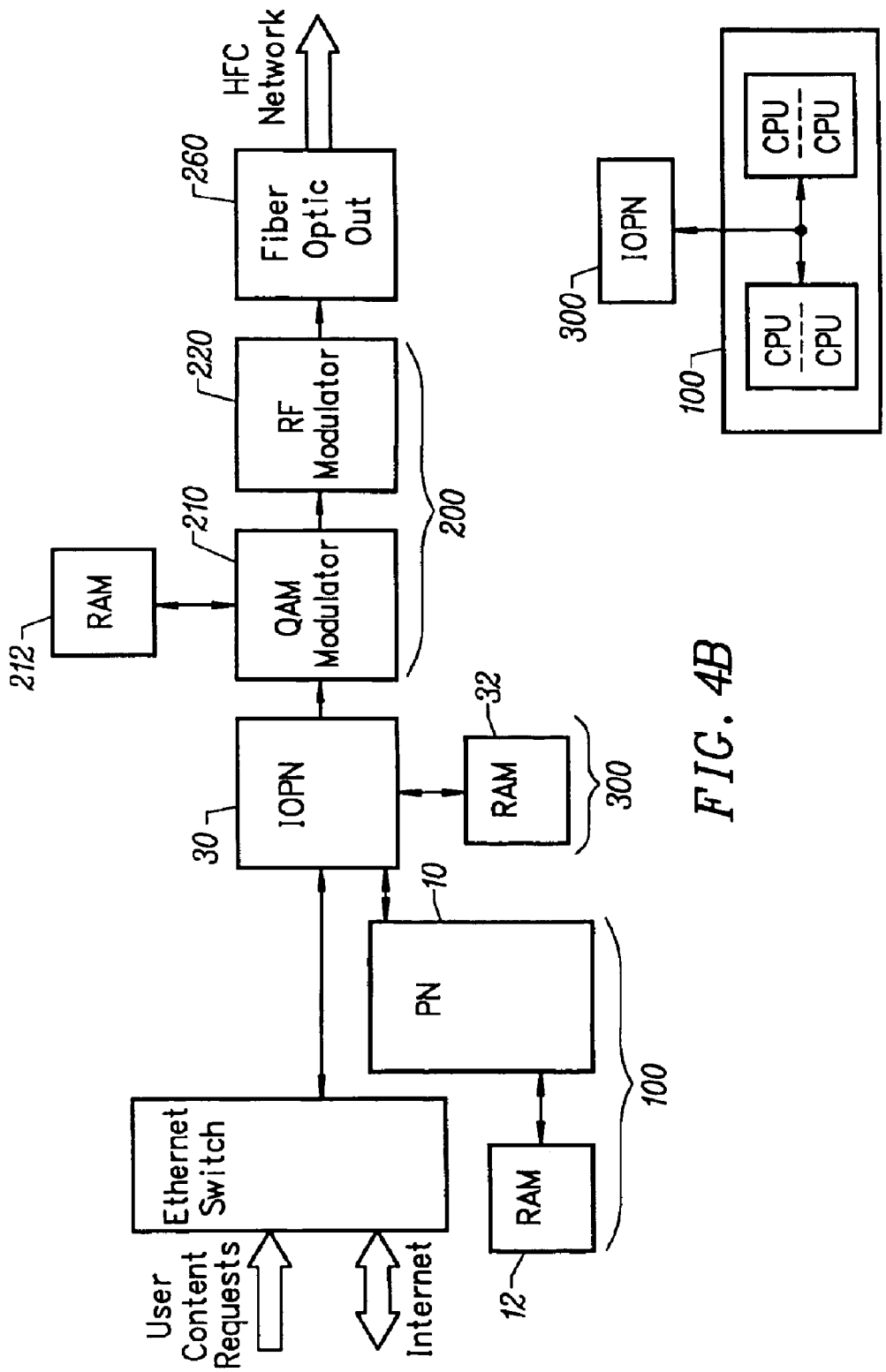

METHOD AND PROCESSOR ENGINE ARCHITECTURE FOR THE DELIVERY OF AUDIO AND VIDEO CONTENT OVER A BROADBAND NETWORK

CROSS REFERENCE TO RELATED APPLICATIONS

This application is related to U.S. Ser. No. 60/210,440 filed Jun. 8, 2000, entitled "Method and Apparatus for Centralized Voice-Driven Natural Language Processing in Multi-Media and High Band" by inventors Ted Calderone, Paul Cook, and Mark Foster and to U.S. Ser. No. 09/679,115 filed Oct. 4, 2000, entitled "System and Method of a Multi-Dimensional Plex Communication Network" by Theodore Calderone and Mark J. Foster.

FIELD OF THE INVENTION

The present invention relates to the field of delivering compressed audio or video (AV) content over a broadband network. The present invention further relates to the field of delivering user requested AV content, which is retrieved from a switched backbone network such as the Internet, over a broadband network. The present invention further relates to the field of delivering video-on-demand over a broadband network.

BACKGROUND

Access to the Internet has experienced widespread growth. Owing to the growth in access has been the decreased cost of the software and hardware necessary for gaining access. However, notwithstanding the decreased cost of the hardware necessary for accessing the Internet, a significant segment of the population still cannot afford the costs associated with the traditional hardware necessary to access the Internet. Thus, while the Internet has the potential to positively impact people's lives, economic barriers remain a substantial impediment to many. It follows that a need exists for a less expensive Internet access means to reach that segment of the population that cannot ordinarily afford an Internet access system.

Ordinarily, one must sacrifice performance to provide a more affordable Internet access system. Thus, Internet access system designers have sacrificed performance as they looked for ways to save costs. At least one prior Internet access system takes advantage of the circumstance that a great number of homes already have televisions and use the television CRT and sound system through which the output of a Internet application session is conveyed to the user. This prior art solution however features complex customer electronics that rival the cost and complexity of most desktop Internet access systems. Moreover, this prior art solution further requires a separate physical transport channel for the bi-directional communications between each STB 500 and the Internet Service Provider (ISP).

Most homes are also connectable to a Residential Broadband (RBB) Access Network. A generic cable-television (CATV) Hybrid Fiber Coaxial (HFC) network is an example of such an RBB network. Referring to FIG. 1, a generic HFC network is characteristically hierarchical and comprises a Metropolitan Headend 92 coupled to a plurality of local Headends 94, each local Headend 94 being further coupled to a plurality of Nodes 96. In a point-to-multipoint (PTMP) Access Network, each Node 96 is further coupled to a plurality of Set-Top-Boxes ("STB") 500 via a shared coaxial line—typically through a local interface 98 that provides bi-directional amplification of the HFC network communications.

The HFC network is currently used as a transport layer to deliver digitally compressed CATV programming to homes. Particularly, current digital CATV systems use MPEG2 transport streams (TS) and require that the home display device include a MPEG2 decoder. MPEG2 TS comprise audio, video, text or data streams that further include (PIDs), Program Identifiers. A PID identifies the desired TS for the MPEG2 decoder and is mapped to a particular program in a Program Map Table (PMT). Thus, a PID table and PMT within the decoder define the possible program choices for a digital CATV decoder and tuning a program for a digital CATV STB 500 comprises joining a TS of MPEG2 encoded frames. The PID table and PMT are remotely updated by the CATV service provider when the viewers choices for programming change.

MPEG2 compression is well known in the art. MPEG2 compression features both spatial and temporal compression. MPEG2 spatial compression comprises an application of the Discrete Cosine Transform (DCT) on groups of bits (e.g. 8×8 pixel blocks) that comprise a complete and single frame of visual content to distill an array of DCT coefficients that is representative of the frame of visual content. The resulting array of DCT coefficients are subsequently submitted to Huffman run-length compression. The array of compressed DCT coefficients represents one frame of displayable video and is referred to as an MPEG2 Intra frame (I-frame) when combined with a PID identifiable by a STB 500.

Temporal compression in MPEG2 comprises using knowledge of the contents of the prior video frame image and applying motion prediction to further bit reduction. MPEG2 temporal compression uses Predicted frames (P-frames) which are predicted from I-frames or other P-frames, and Bi-directional frames (B-frames) that are interpolated between I-frames and P-frames (For a discussion of MPEG-2, see B. Haskell, A. Puri, A. Netravali, *Digital Video: An Instruction to MPEG-2*, Kluwer Academic Publishers (1997)). An increased use of B-frames and P-frames account for the greatest bit reduction in MPEG2 TS and can provide acceptable picture quality so long as there is not much motion in the video or no substantial change in the overall video image from frame to frame. The occurrence of a substantial change in the video display requires calculation and transmittal of a new I-frame. An MPEG2 Group of Pictures (GoP) refers to the set of frames between subsequent I-frames.

The HFC network may also support upstream data communication from each STB 500 in the 5–40 MHz frequencies. If so, upstream data communication is typically supported between each STB 500 and upstream communications receiving equipment 97 (hereinafter "RCVR 97") situated either at the Node 96 or the Headend 94. Upstream communication from each STB 500 enables requests for special programming to be communicated to the cable television service provider (e.g. request a PID associated with a particular pay per view program). Upstream data communication also conveniently permits collective management of the plurality of STBs 500 by an administrative function that is conveniently located elsewhere on the HFC.

Thus, one potential means of providing Internet access uses the RBB network such as the CATV HFC network as the transport layer through which bi-directional data communications are conveyed to and from an ISP. However, the upstream bandwidth on the HFC network is limited, and will without doubt come under increased demands as this prior art solution and other applications seek to take advantage of this HFC network capability. Therefore, the efficient use of this limited upstream bandwidth presents a hurdle to creators of bi-directional communication based applications implemented on the HFC network.

One potential approach that accommodates the limited upstream bandwidth uses the home television as a display device, and a STB 500 incorporating the functions of a "thin" remote client. The remote client may be incorporated into the STB 500 for convenience or into the display device. See FIGS. 2*a* and 2*b*. The remote client requires only that amount of hardware and software necessary to send Internet application commands and a unique STB 500 identifier upstream to the RCVR 97. At the Headend 94 or Node 96, application commands and STB 500 identifiers are conveyed from the RCVR 97 to an Ethernet Switch that is further coupled to a plurality of distinct AV content processing boards.

FIG. 3 depicts a representative diagram of this prior-art solution that can accommodate delivering MPEG video content to multiple remote clients via the HFC network. In this solution, each AV content processing board establishes an Internet application session for each remote client that requests Internet AV content. The Internet AV content processing board recovers the requested Internet content and outputs the AV content to the STB 500 in a MPEG transport stream appended to a PID expected by the STB 500.

This solution presents a more affordable system for the end consumer as it shifts a substantial portion of the hardware and software costs that would typically impact the home up the RBB network to the CATV services provider, where the cost can be amortized over many users. This approach also is permits the implementation of a relatively high performance Internet AV content delivery system. In contrast, the prior art solution suffers substantial cost and complexity for the RBB administrator and would likely therefore deter a RBB administrator from implementing the system depicted in FIG. 3. It follows that reducing costs for the RBB administrator has the potential to increase industry acceptance of Internet AV content delivery over the HFC network. Accordingly, there is a need for less expensive system design that is capable of processing and retrieving the Internet content requested by remote clients, and delivering that Internet content in a format recognizable by remote clients.

SUMMARY OF THE INVENTION

The present invention generally comprises a method of delivering compressed audio or video (AV) content over a broadband network to a decoder in a STB 500. The method comprises the use of an AV Engine comprising at least two processing nodes including a Processing Node (PN) coupled to an Input/Output Node ("ION"). The ION is further coupled to an Internet connection, which enables the AV Engine to retrieve Internet AV content to the PN. The ION is further coupled to the RBB RCVR 97, which enables bi-directional data communication between the AV Engine and the STB 500. Data communication between the AV Engine and the STB 500 enables requests for Internet AV content to be sent to the AV Engine by the STB 500; and channels and PIDs that will carry the retrieved content to be sent to the STB 500 by the AV Engine.

The PN creates a spatially compressed frame of the AV content and signals to the ION the availability of the spatially compressed frame of AV content. Moreover, the PN receives a unique PID. The ION accesses the local memory to retrieve the spatially compressed frame of Internet AV content and creates a temporally compressed frames based on the spatially compressed frame. The ION then transmits a stream of frames comprising a spatially and temporally compressed representation of the Internet AV content with the unique PID to the requesting STB 500.

Certain embodiments of the invention enable the recognition and delivery of previously compressed audio and motion video to a requesting STB 500 without duplicative attempts at compression by the AV Engine.

Certain other embodiment of the invention provide for the delivery of video on demand services.

Certain other embodiments of the invention implement the use an array of processing nodes wherein at least a portion of the processing nodes perform the function of the PN and at least another portion of the processing nodes perform the function of the ION.

Finally, the RBB network depicted in FIG. 1 is for illustrative purposes only and is not intended to imply that the method or apparatus of the present invention to be described in the disclosure below is limited to any particular RBB network architecture. In light of the disclosure that follows, it is within the knowledge of an ordinarily skilled practitioner to modify the method and device of the present invention for alternate RBB network architectures.

BRIEF DESCRIPTION OF THE DRAWINGS

FIG. 4*b* depicts a second embodiment of the present invention.

FIG. 4*c* depicts interconnection between a Processing Node and an Input/Output Processing Node shown in FIG. 4*b* of the present invention.

DESCRIPTION OF THE PREFERRED EMBODIMENTS

Figure 1:
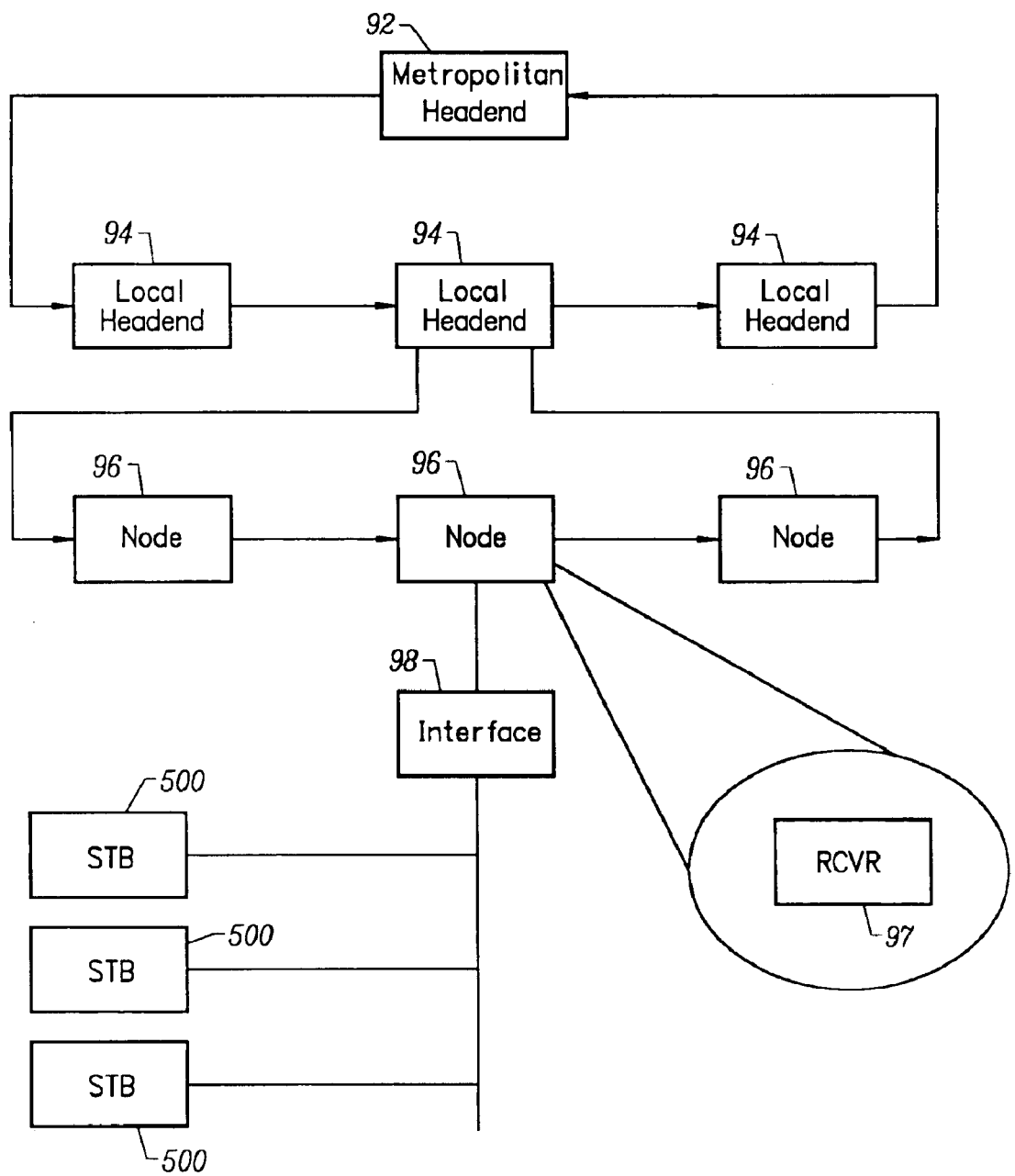
FIG. 1 depicts a generic residential broadband HFC network.
Figure 2A:
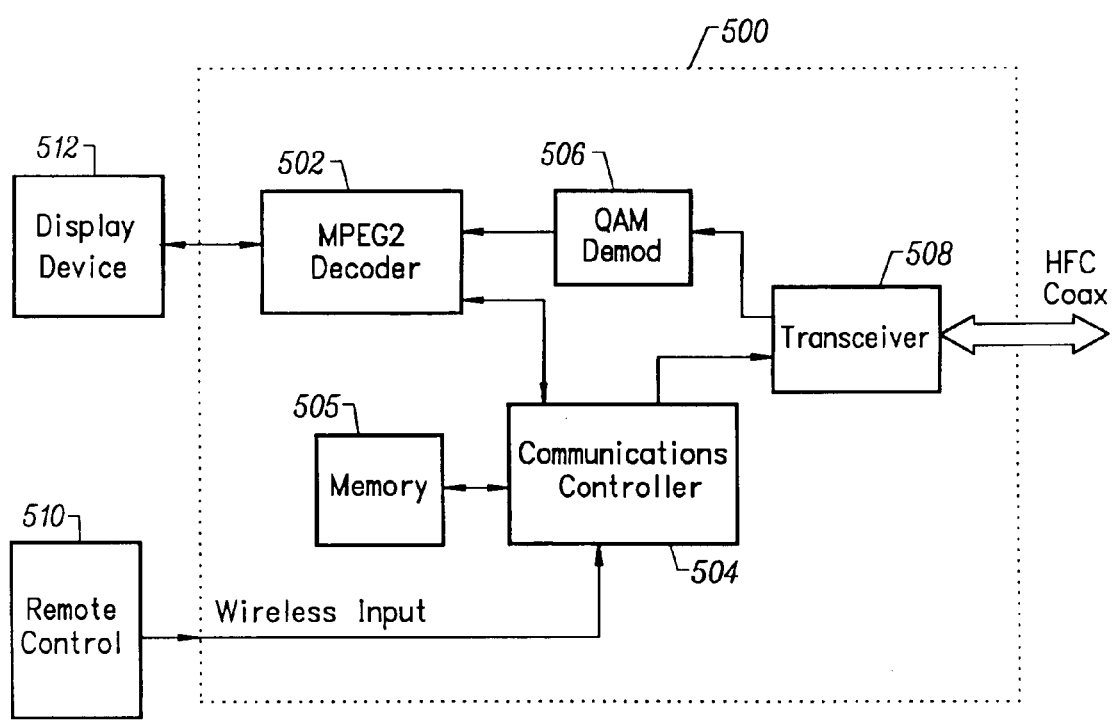
FIG. 2*a* depicts a first embodiment of a thin remote client set top box.
Figure 2B:
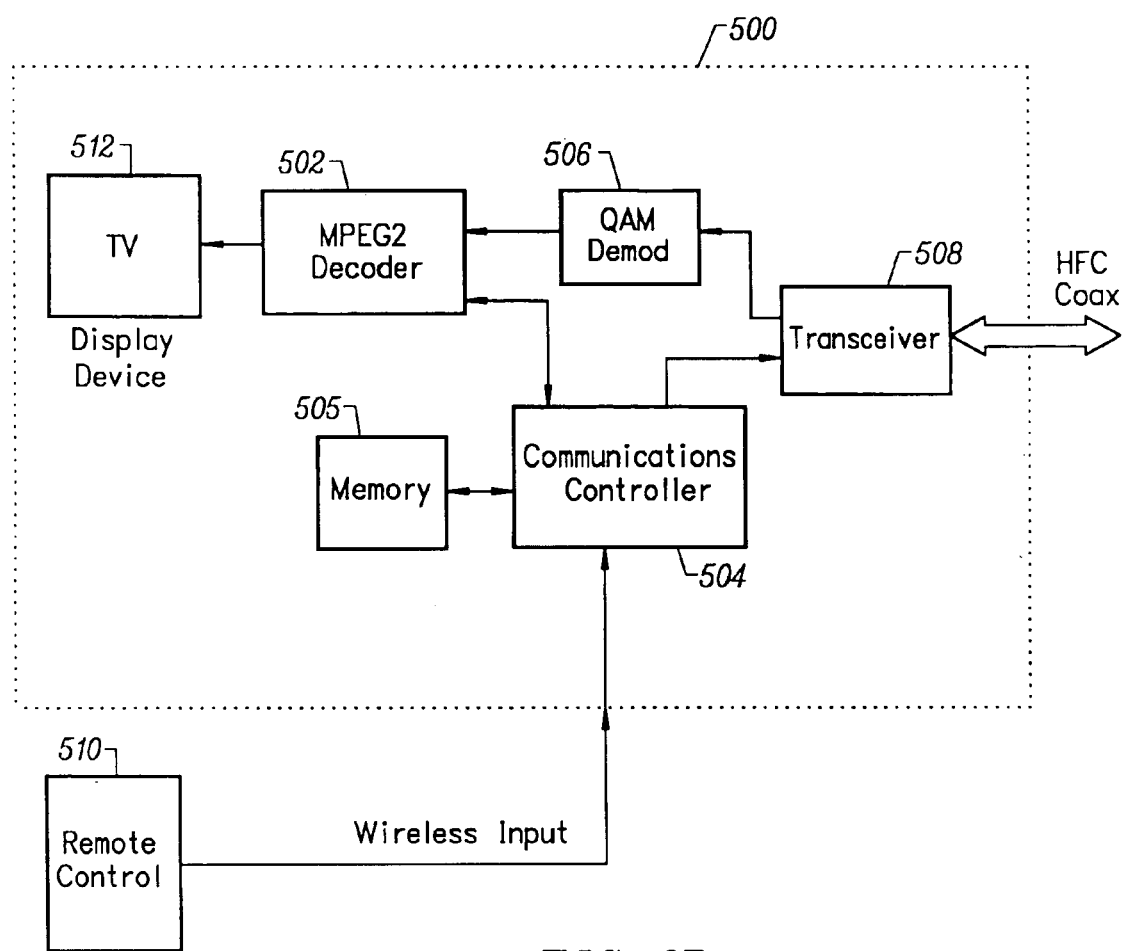
FIG. 2*b* depicts a second embodiment of a thin remote client set top box.
Figure 3:
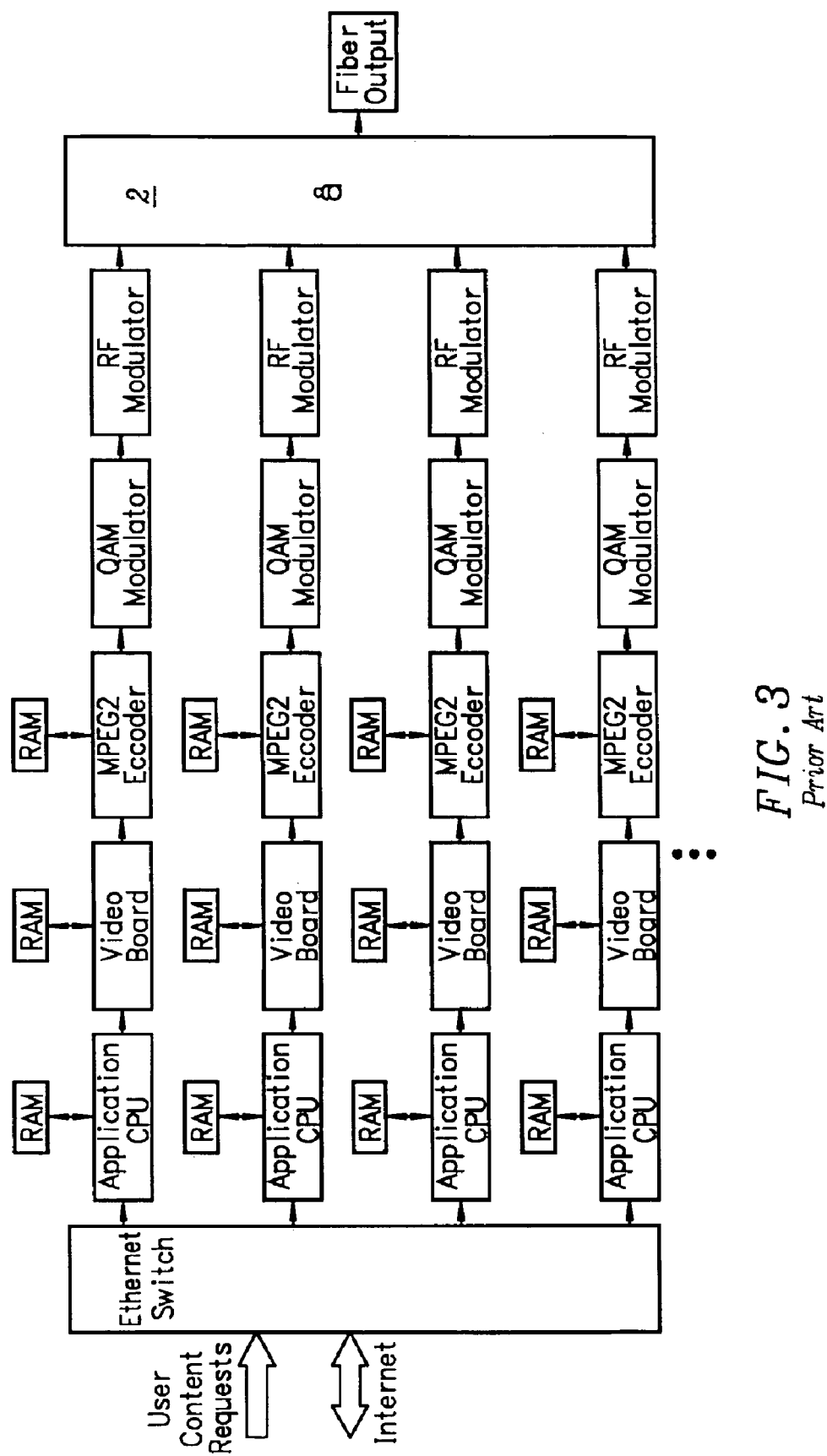
FIG. 3 depicts a prior art system for delivering compressed video content to set top boxes.

The preferred embodiment of the present system is useful for the delivery of compressed AV content to a remote client via an existing CATV RBB network. Referring to FIG. 1, operation of the disclosed embodiments is initiated when a remote client sends a request for Internet AV content to an AV Engine implementing the present invention. The request from the remote client for AV content may be transmitted to the present invention through the upstream data path to the RCVR 97 of the RBB network, which is coupled to the present invention; through a separate telephone line coupled to the present invention by a telephony server; or through another custom communication path.

For the purposes of this description, a remote client includes upstream transmission capability and is coupled to Terminal Equipment (TE) located at a client location. TE includes computer hardware and software capable of decoding and displaying spatially and temporally compressed AV content. For the purposes of this description, AV content includes still frames of video, frames of motion video, and frames of audio.

Figure 4A:
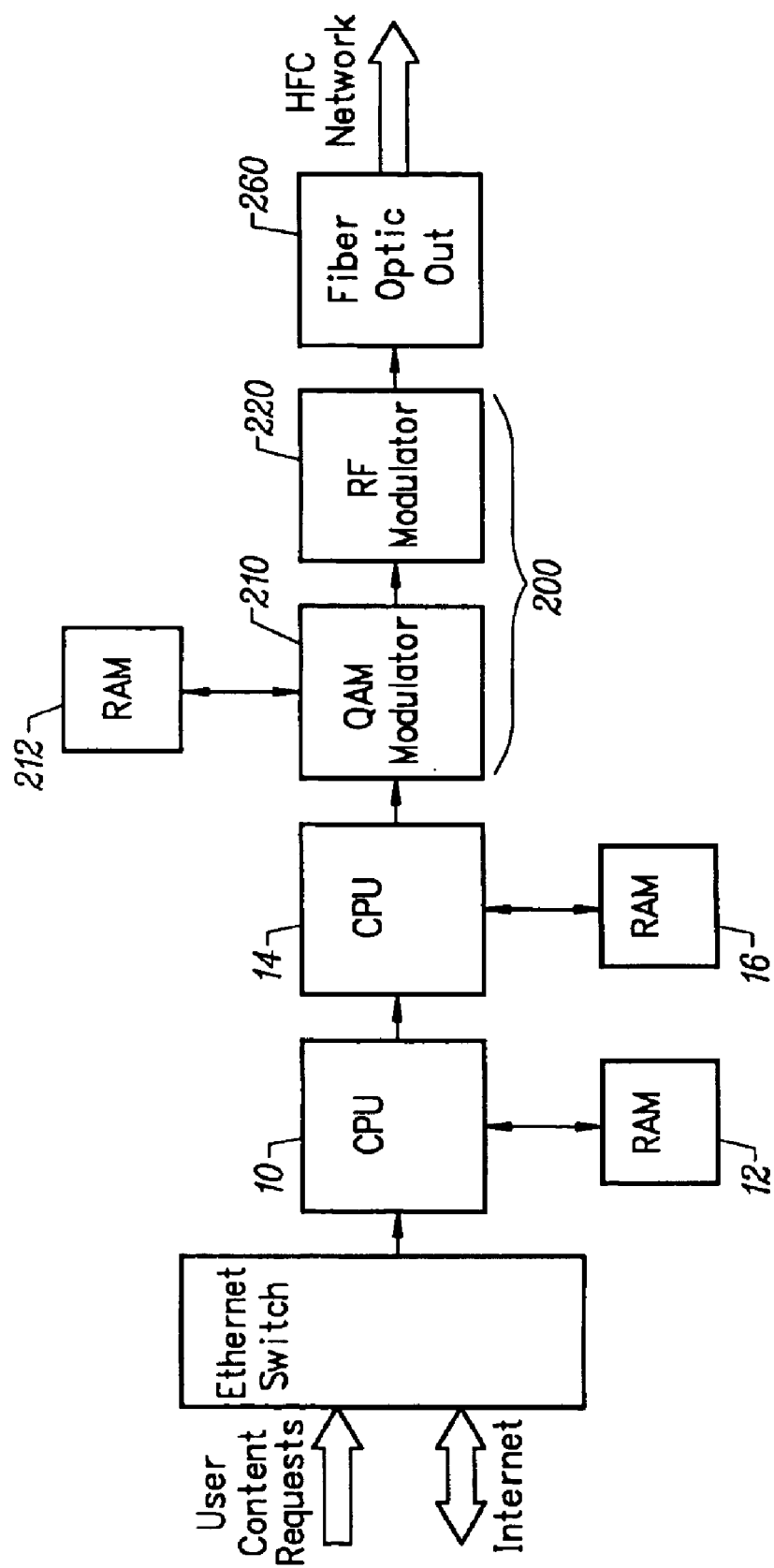
FIG. 4*a* depicts a first embodiment of the present invention.

FIG. 4a depicts a first embodiment of the AV Engine. The AV content request from the remote client is communicated to the AV Engine from the RCVR 97. The RCRV 97 may be coupled to the AV Engine using an Ethernet switch. In the first embodiment, the AV engine comprises a Central Processing Unit (CPU) 10 coupled to local memory 12, and also coupled an Output Processing Unit (OPU) 14 that is further coupled to local memory 16. The CPU 10 and OPU 14 preferably each comprise an instruction set processor that changes state based upon a program instruction. The CPU 10 may be coupled to the OPN 14 using a variety of high-speed bi-directional communication technologies. Preferred communication technologies are based upon point-to-point traversal of the physical transport layers of the CPU 10 and the OPU 14 and may include a databus, fiber optics, and microwave wave guides. Such communication technologies may also include a messaging protocol supporting TCP-IP for example. Further embodiments support Wavelength Division Multiplex (WDM) communications through the physical transport layer coupling the CPU 10 and OPU 14.

Upon receipt of the AV content request, an application session is initiated on the CPU 10. Moreover, the CPU 10 communicates back to the remote client to update the PID table and PMT of the remote client to contain a channel and PID that will carry the remote client's requested AV content. The CPU 10 is further coupled to a switched network such as the Internet through which AV content may be accessed and retrieved. Thus, the application session operated on the CPU 10 may comprise an Internet Browser application session that accesses Internet servers or databases available on the World Wide Web. The CPU 10 is coupled to memory 12 and controlled by application software to access the switched network and retrieve the AV content requested by the remote client and render the retrieved AV content to memory 12. The first embodiment further includes a software module that controls the CPU 10 to spatially compress the AV content. The presently preferred spatial compression performed on the AV content creates a MPEG2 I-frame without the traditional data overhead necessary to identify the program stream to a STB 500. Thereafter, CPU 10 passes the I-frame to the OPU 14 along with the unique PID with which to associate the I-frame.

The OPU 14 receives the I-frame and stores it to memory 16. The OPU 14 is controlled by software to add three classes of information that transforms the I-frame into an MPEG2 TS GoP. First, formatting data is included by the OPU 14 that transforms the I-frame into an MPEG2 I-frame. The formatting necessary to perform the I-frame to an MPEG2 I-frame is considered to be obvious to one of ordinary skill in the art. Next, the OPU 14 calculates MPEG2 P-frames and B-frames to render a MPEG2 TS. Finally, the OPU 14 appends the unique PID expected by the remote client and commences transmission of the MPEG2 TS representing the requested AV content. The MPEG2 transport stream representing the AV content is subsequently output to a Quadrature Amplitude Modulator (QAM) 210 and RF upconverter 220 (collectively hereafter "Post Processing 200") and transmitted 260 through the RBB network to the remote client at a sufficient rate to ensure adequate picture quality on the TE.

The same MPEG-2 transport stream that includes the first calculated GoP will be continuously transmitted by the OPU 14 of the AV Engine to the remote client until either new AV content is requested and the OPU 14 receives a new I-frame, or until the application session is terminated either by a command from the remote client or by prolonged inactivity. If the CPU 10 receives a subsequent request for AV content from the remote client, the process begins again generating a new MPEG2 transport stream representing the newly acquired AV content.

In a second embodiment depicted in FIG. 4b, the AV engine comprises a Input/Output Processing Node (IOPN) 30 coupled to local memory 32 (collectively "IOPN 300") and a Processing Node (PN) 10 including local memory 12 (collectively "PN 100"). The PN 100 comprises at least one instruction set central processing unit (CPU) that changes based upon a program instruction. Certain embodiments of the invention include a PN 100 comprising a plurality of instruction set CPUs.

FIG. 4c depicts the interconnection between such type PN 100 and a IOPN 300. In such embodiments, each of the plurality of instruction set CPU may actually comprise pair of dual-CPU that are bi-directionally coupled to the other dual-CPU and the IOPN 300. Each dual-CPU within the PN 100 may be coupled to the other dual-CPU and the IOPN 300 using a variety of high-speed bi-directional communication technologies. Preferred communication technologies are based upon point-to-point traversal of the physical transport layers of the dual-CPU and the IOPN 300 and may include a databus, fiber optics, and microwave wave guides. Such communication technologies may also include a messaging protocol supporting TCP-IP for example. Further embodiments support Wavelength Division Multiplex (WDM) communications through the physical transport layer coupling the dual-CPU and IOPN 300.

In this second embodiment, the IOPN 300 communicates all the throughput traffic to and from the AV engine and is therefore coupled to the switched network, the RCVR 97, the PN 100, and the post processing 200 hardware. The IOPN 300 interfaces with the switched network to process the AV content requests of the PN 100 and may be coupled to the switched network with an Ethernet switch or equivalent. The IOPN 300 preferably couples to the switched network, the RCVR 97, and the post processing 200 hardware using high speed fiber-optic interconnects.

Figure 4D:
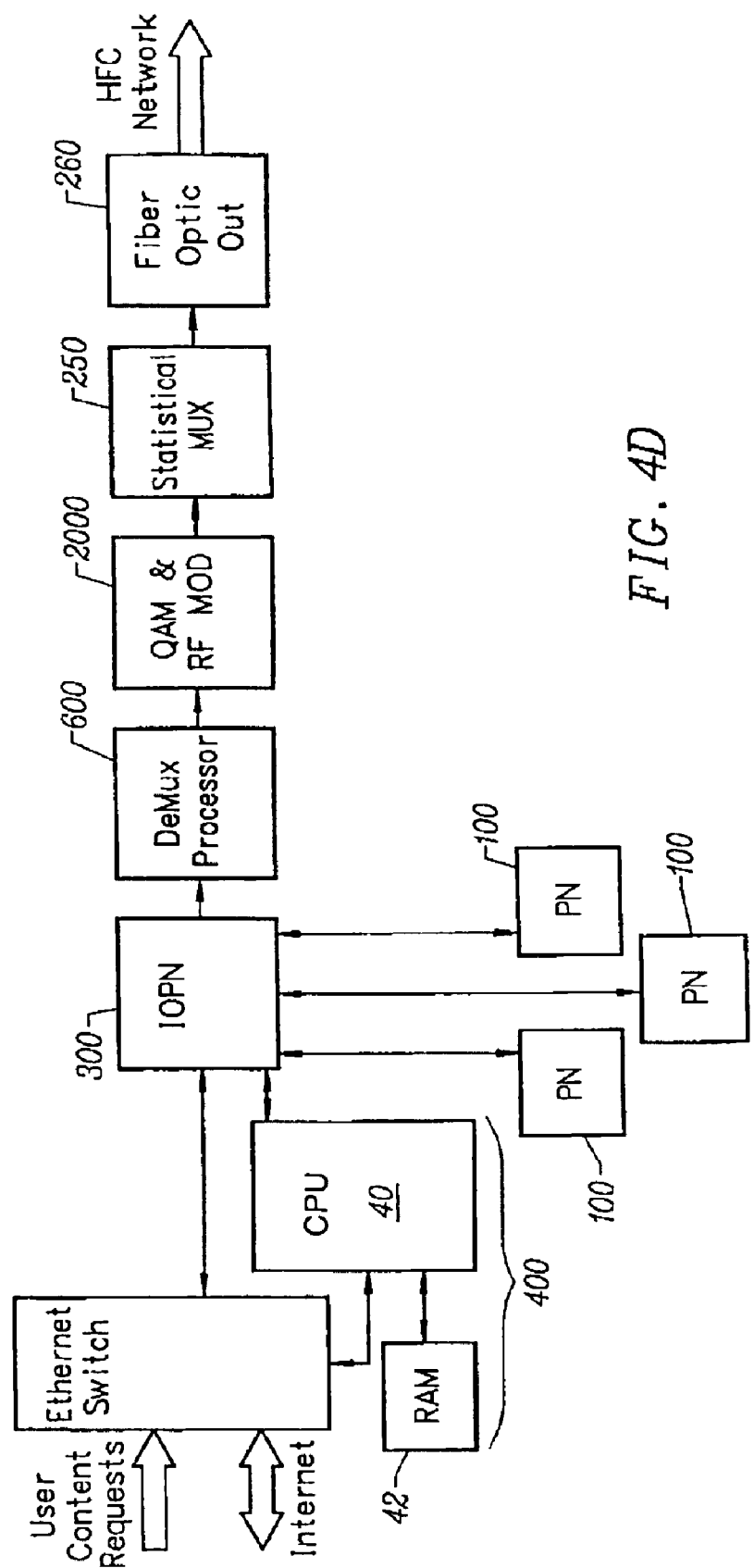
FIG. 4*d* depicts a third embodiment of the present invention.

FIG. 4d depicts a third embodiment that further includes a Control Processor Unit 40 with memory 42 (collectively "CPN 400"). At least one additional PN 100 may optionally be included in this embodiment. The IOPN 300 includes the quantity of communication ports to directly cross-couple is each of the either CPN 400 or plurality of PN 100. As with the previous embodiment, communication between the CPN 400 and the IOPN 300, or the PN 100 and the IOPN 300 requires traversal of the physical transport layer of the IOPN 300, the PN 100, or the CPN 400. Accordingly, the preferred physical transport layer includes high-speed technologies including fiber-optics, databus, and microwave wave guides. The CPN 400 may be an instruction set computer that changes state upon the execution of a program instruction. Moreover, the CPN 400 may also comprise a dual-CPU such as that depicted in FIG. 4c and coupled to the IOPN 300 in the same manner as the PN 100.

As with the previous embodiment, the IOPN 300 is coupled to the switched network and to the RCVR 97 to forward requests received from the remote clients to the plurality of PN 100. The PN 100 establishes an Internet application session for each request for AV content received. The IOPN 300 also interfaces with the switched network to access and retrieve the AV content requested by the plurality of PNs 100. The CPN 400 operates under program control to load balance multiple AV content requests received from distinct remote clients. The CP 400 program control distributes the AV content requests among the plurality of PN 100 to mitigate against performance degradation that would otherwise result if multiple remote client AV content requests were forwarded by the IOPN 300 to the same PN 100. Thus, each PN 100 may acquire unique AV content and output a unique I-frame as a result of each remote client's AV content request and PN 100 application session. The IOPN 300 receives the I-frames and unique PIDs representing the distinct AV content requests and subsequently assembles an MPEG2 GOP transport stream for each received I-frame of AV content. The IOPN 300 outputs the GoP transport streams to post processing 200 and Multiplexing 250 in preparation for output 260 and distribution through the RBB network to the remote client.

Figure 4E:
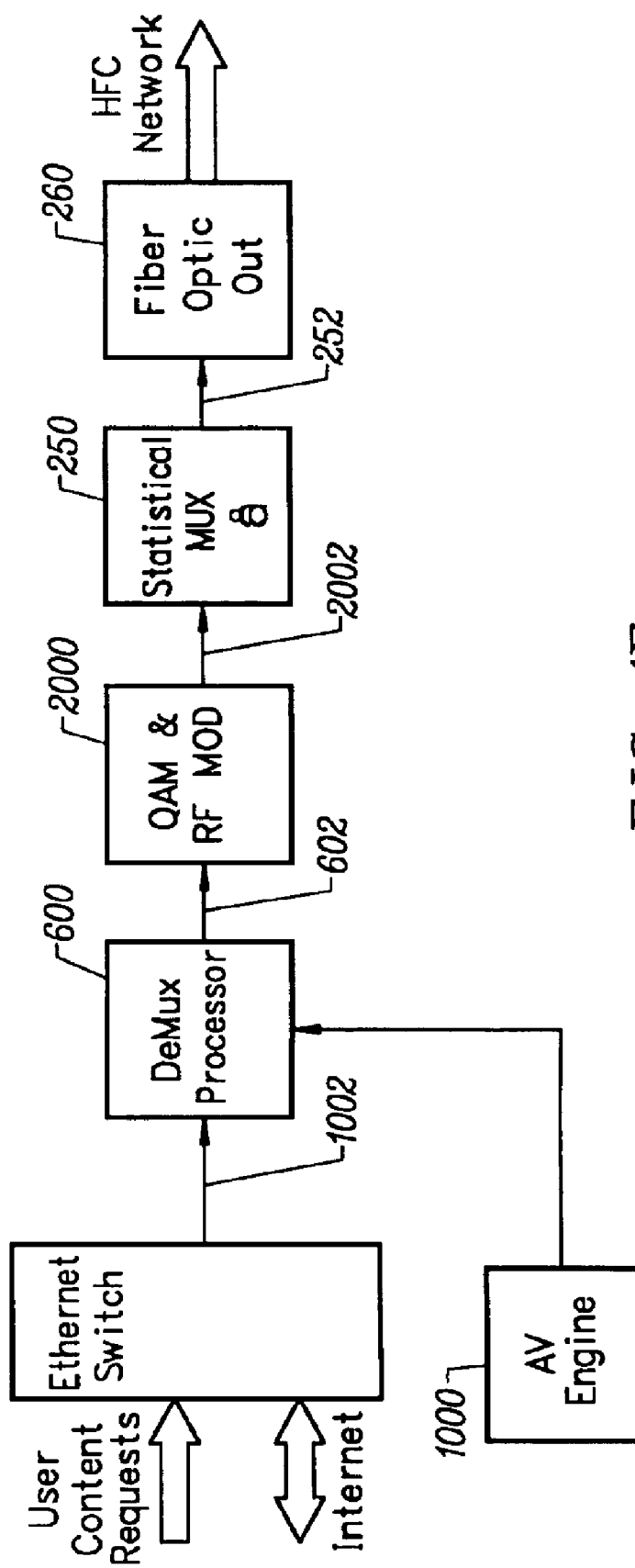
FIG. 4*e* depicts a fourth embodiment of the present invention.

FIG. 4e depicts a block diagram of a fourth embodiment of the present invention. This embodiment features the AV engine 1000 coupled 1002 to a DeMux Processor 600 and also to the RVCR 97 and the switched network, such as the Internet. The AV engine 1000 further comprises at least one array of processing nodes. Each of the processing nodes preferably comprises a pair of dual-CPU as depicted in figure 4c that are bi-directionally coupled to the other pairs of dual-CPU.

Figure 5A:
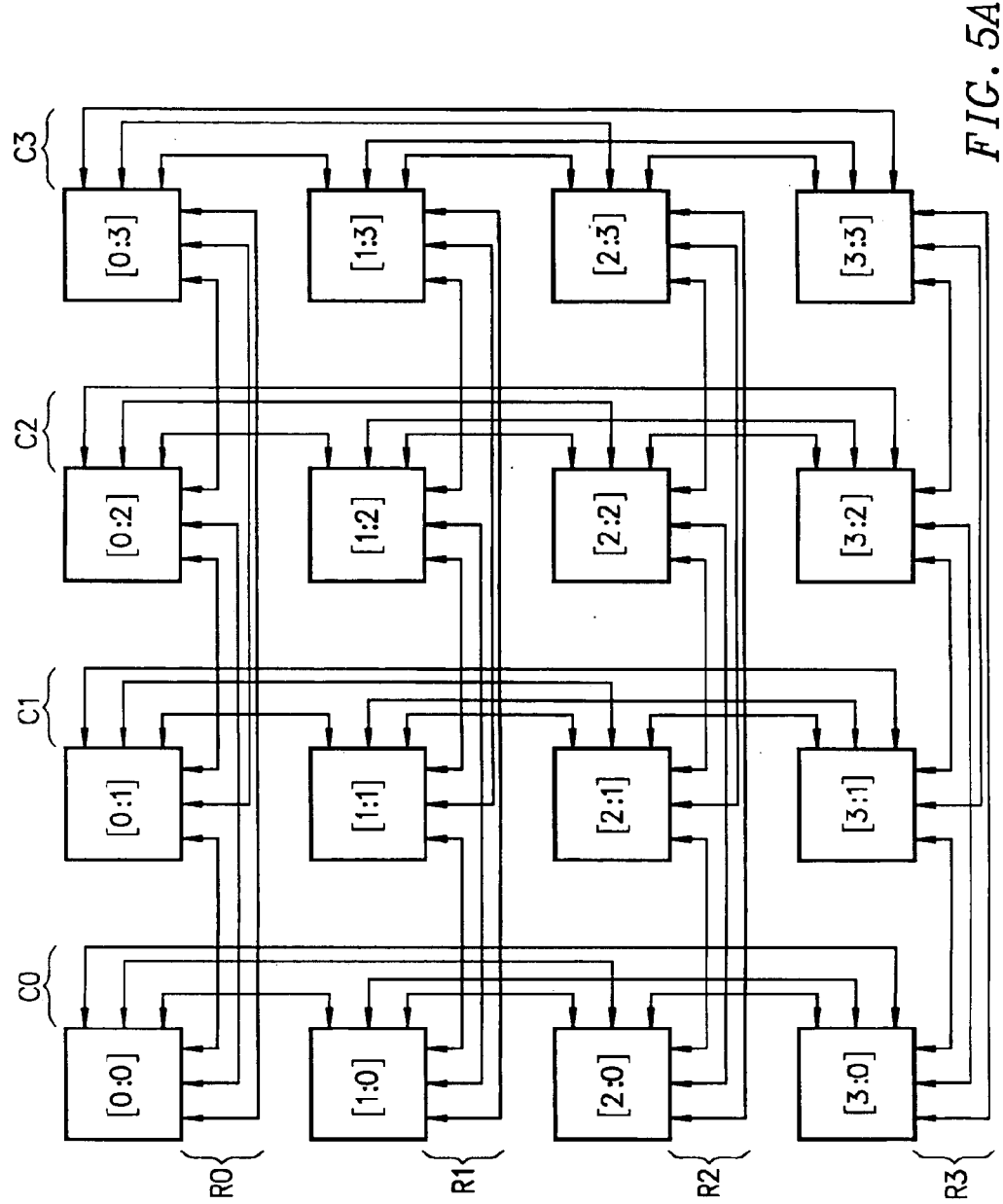
FIG. 5*a* depicts an array of processing nodes that are orthogonally coupled.

FIG. 5a depicts 4×4 array of processing nodes with 2 orthogonal directions. Moreover, the 4×4 array of processing nodes are orthogonally coupled R0, R1, R2, R3 and C0, C1, C2, C3) as depicted in FIG. 5a. Orthogonally coupled processing nodes indicate that each processing node is communicatively coupled to all processing nodes in each orthogonal direction in the array. Communicative coupled processing nodes support bi-directional communications between the coupled processing nodes. Each processing node may contain a communication port for each orthogonal direction.

Each processing node may contain as many communications ports per orthogonal direction as there are other processing nodes in that orthogonal direction. In the array of FIG. 5a, such processing nodes would contain at least 6 communication ports.

Figure 5B:
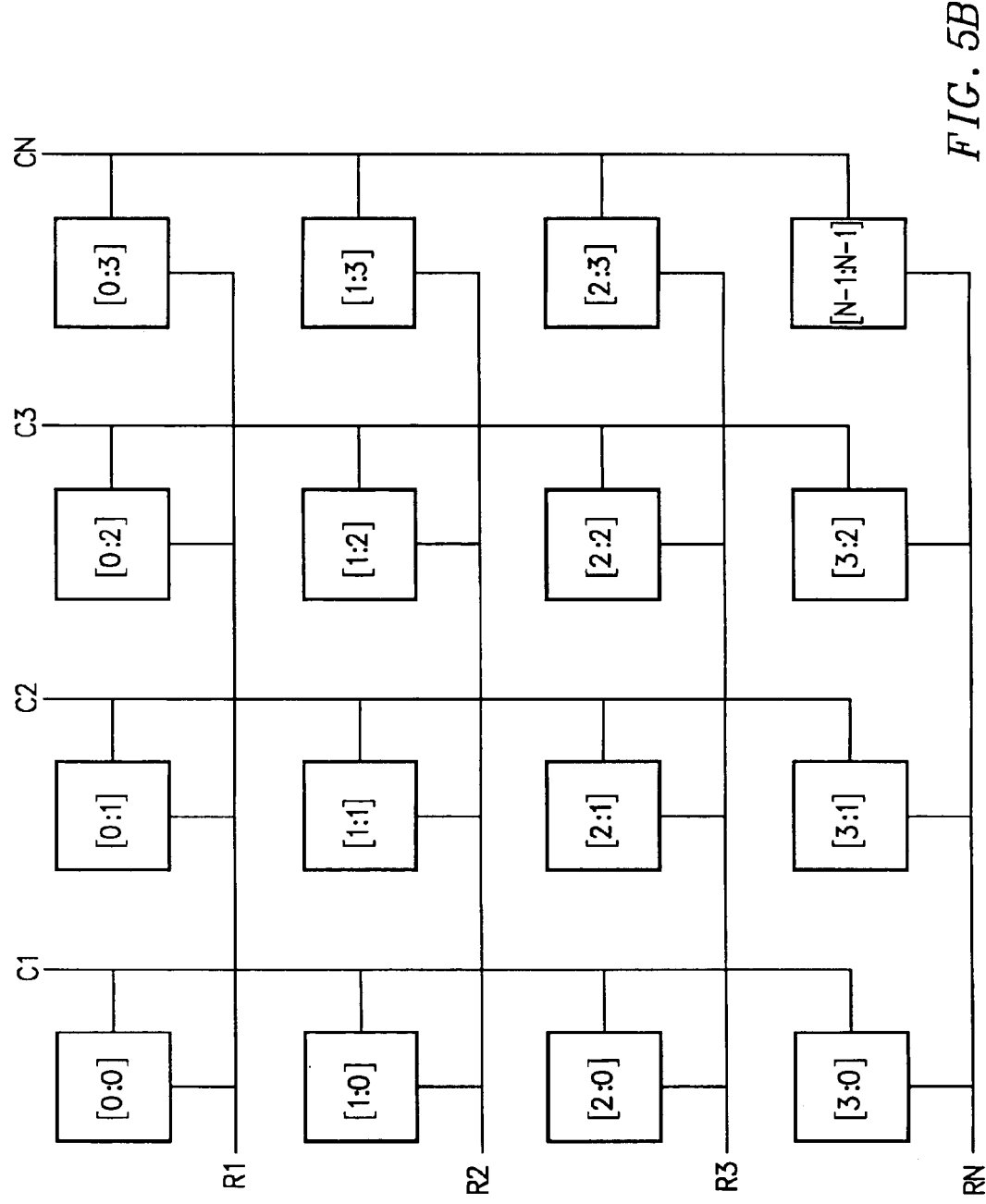
FIG. 5*b* depicts an array of processing nodes that are orthogonally coupled.

FIG. 5b depicts an N^M array of processing nodes that are orthogonally coupled (R1, R2, R3, RN and C1, C2, C3, CN). N refers to the number of processing nodes within a processing node row or column and M refers to the number of orthogonal dimensions in the array of processing nodes, which is two in FIG. 5b.

The previous illustration of orthogonal coupling between processing nodes employed direct point to point interconnections, whereas this illustration portrays orthogonal coupling as a single line for each row and column of processing nodes but still indicates orthogonal coupling as defined by R0, R1, R2, RN and C0, C1, C2, CN in FIG. 5a. Different implementations may employ at least these two interconnection schemes.

Each of the processing nodes is physically distinct and thus communication between nodes comprises traversal of the physical transport layer(s). Traversal from one processing node to another coupled processing node is hereinafter referred to a Hop.

Hopping via processing node orthogonal coupling enables communication between any two processing nodes in the array in at most M Hops.

P-1 additional N^M arrays can be added for a total of P*(N^M) processing nodes. Orthogonal coupling between the P arrays enables communication between any two arrays in the P array in one Hop. Communication from a processing node of a first array to a processing node of a second array would take a maximum of 2*M+1 Hops.

Figure 6B:
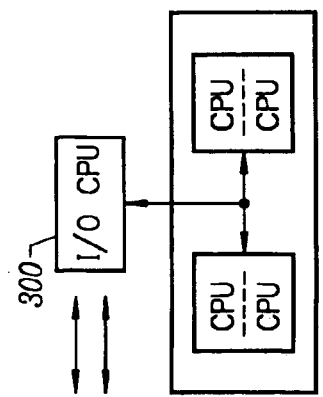
FIG. 6*b* depicts an embodiment of a first array of processing architecture implementing the method of the present invention.
Figure 6A:
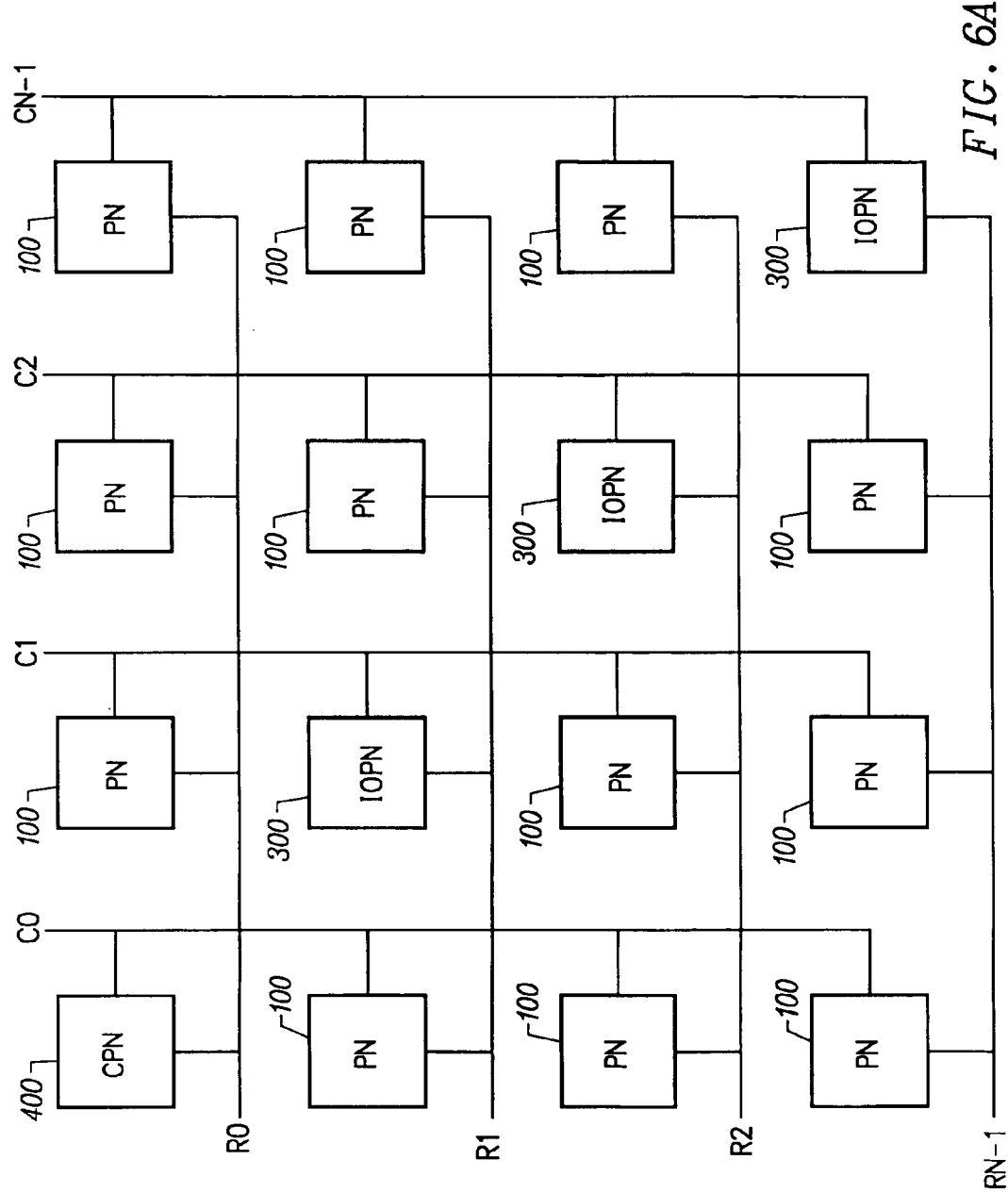
FIG. 6*a* depicts an embodiment of a processing architecture implementing the method of the present invention.

In certain embodiments implementing the processing array, the AV engine 1000 comprises a two-dimensional array of processing nodes as depicted in FIG. 6a. A CPN 400 is positioned at the coordinates [0:0] and a plurality of IOPN 300 are positioned at the processing nodes [1:1,2:2,N-1:N-1].

The CPN 400 may comprise a pair of dual-CPU. CPN 400 may further comprise an additional I/O CPU as depicted in FIG. 4c. The I/O CPU may further comprise a dual-CPU. A CPU of CPN 400, operating under program control, may perform load balancing of the remote client requests for AV content.

The IOPN 300 in this embodiment may comprise dual-CPU as depicted in FIG. 4c. IOPN 300 may further comprise a pair of dual-CPU and at least an additional I/O CPU. The I/O CPU may further comprise a dual-CPU. The I/O CPU may interface with an Ethernet switch. See FIG. 6b.

Each pair of dual-CPU within the array of processing nodes may be coupled to the other pairs of dual-CPU using a variety of communication mechanisms. These communication mechanisms support bi-directional communications. The communication mechanisms may be based upon point-to-point traversal of the physical transport layers of pairs of dual-CPU. The communications mechanisms may include a databus, fiber optics, and microwave wave guides. Such communication mechanisms may also include a messaging protocol supporting TCP-IP for example. Further embodiments support Wavelength Division Multiplex (WDM) communications through the physical transport layer(s) coupling the dual-CPU pairs.

Figure 6C:
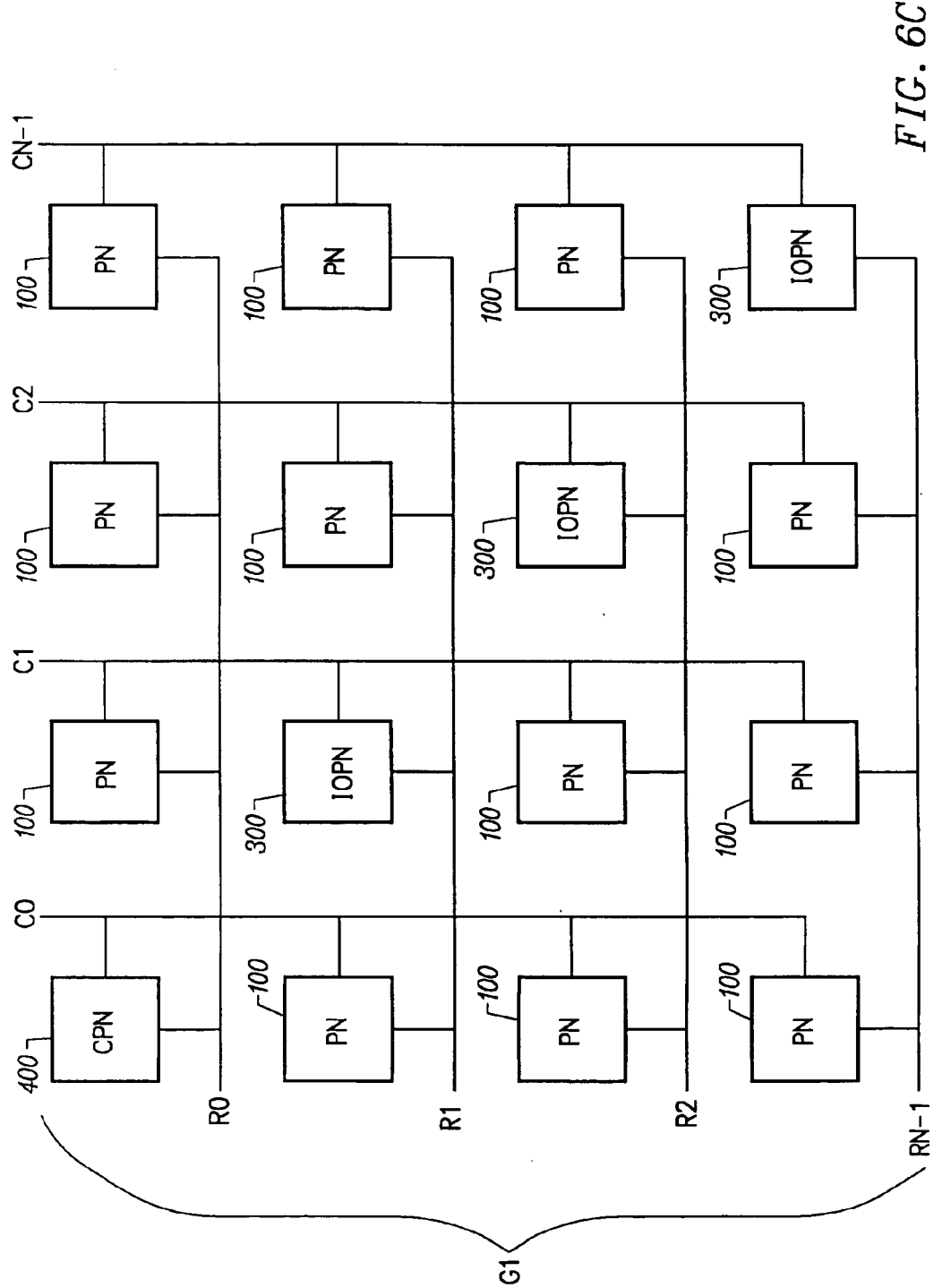
FIG. 6*c* depicts an embodiment of a second array of processing architecture implementing the method of the present invention.
Figure 6D:
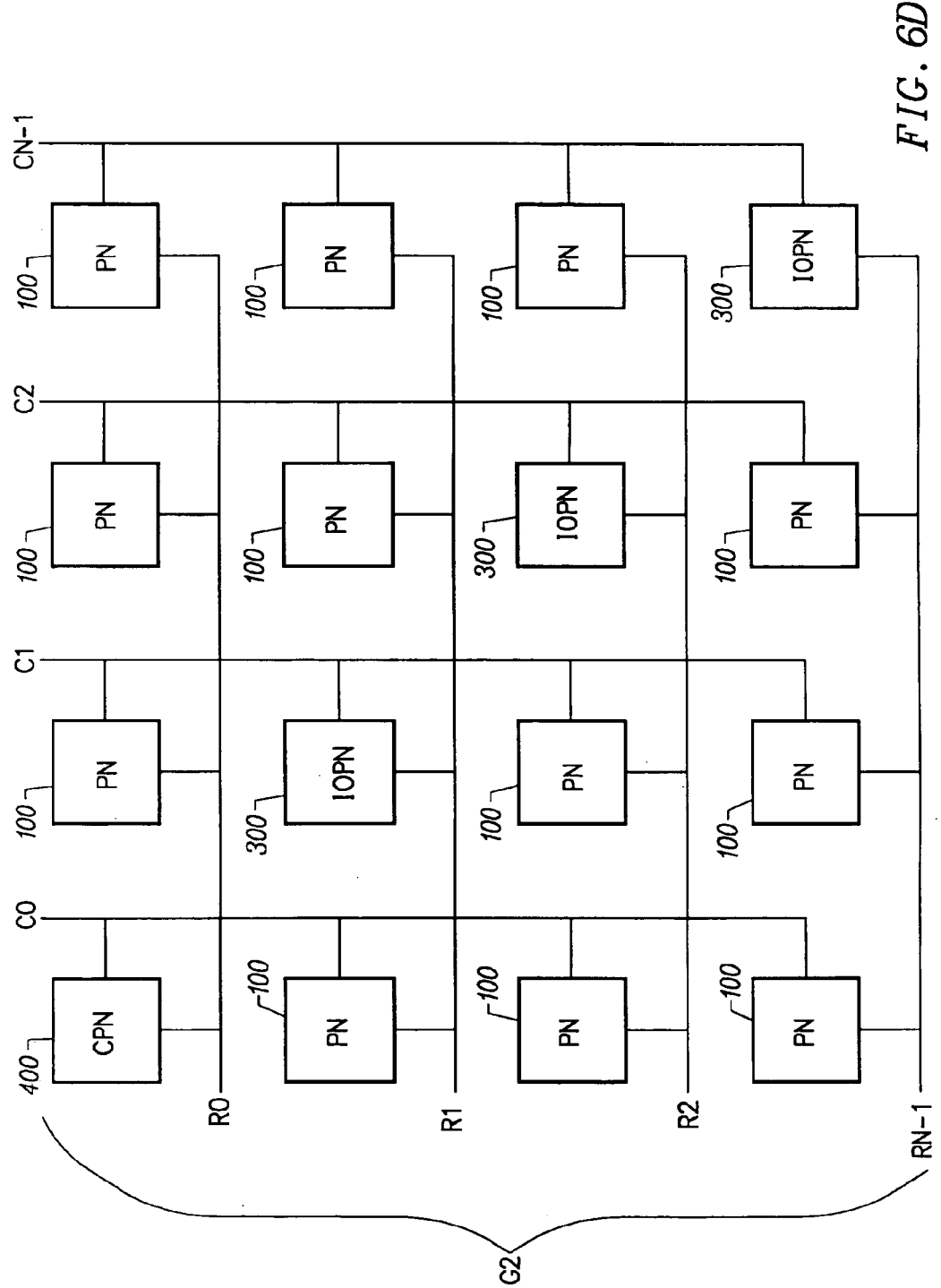
FIG. 6*d* depicts a cross-coupling between the first and second array of processing architecture implementing the method of the present invention.
Figure 6E:
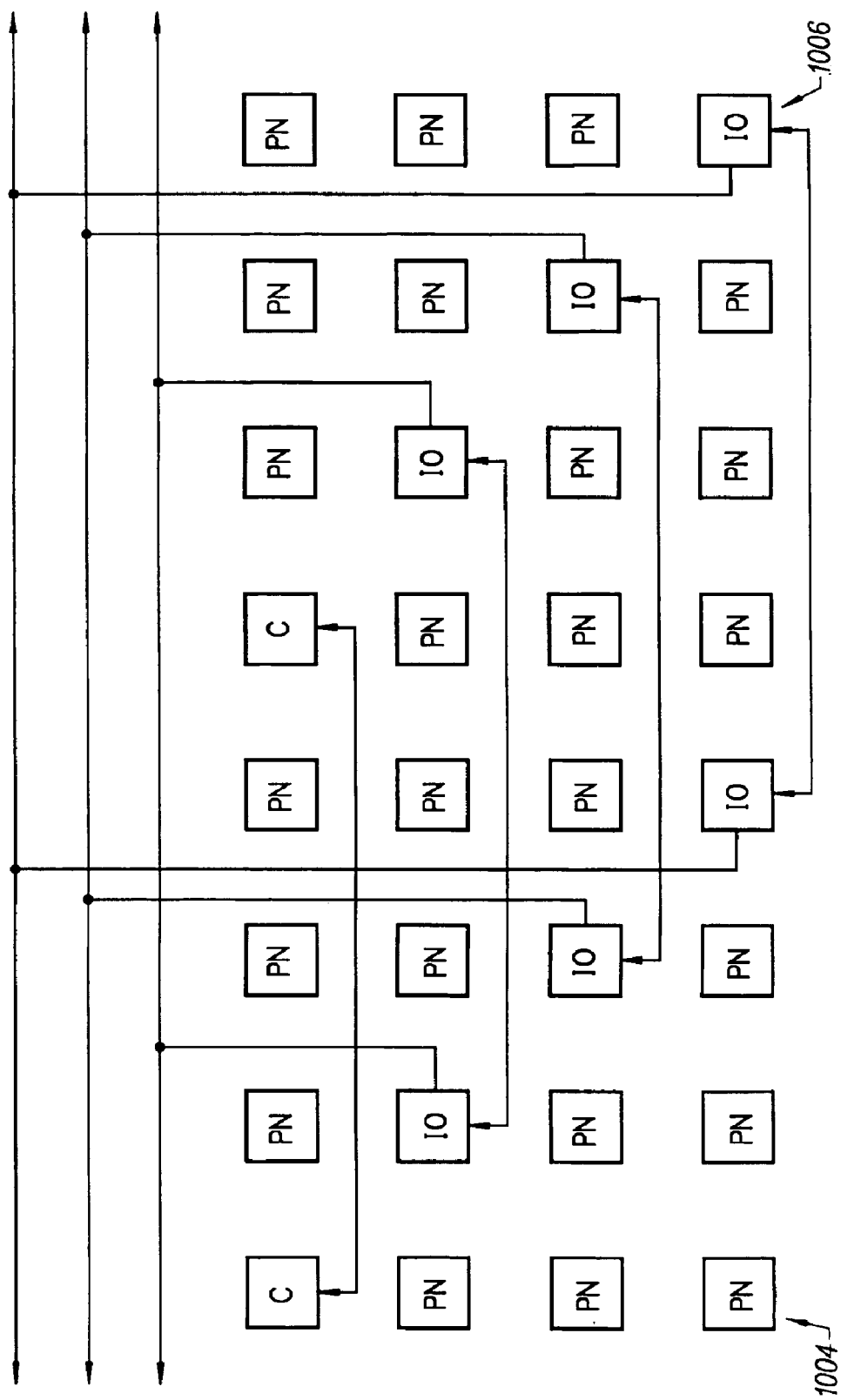
FIG. 6*e* depicts a coupling between the first and second array of processing architecture implementing the method of the present invention.

The AV engine may comprise a first 1004, and a second 1006, two-dimensional array of processing nodes as depicted in FIGS. 6c and 6d respectively and shown collectively in FIG. 6e. The first and second arrays may contain a CPN 400 at each processing node designated by the coordinates [0:0] in each array. Further, a plurality of IOPN 300 may be positioned at the remaining processing nodes along the diagonal from the CPN 400 in each array (e.g. IOPN 300 are at the array coordinates designated by [1:1], [2:2], [N-1:N-1]). Moreover, the IOPN 300 of the first 1004 array may orthogonally couple to its corresponding IOPN 300 in the second 1006 array.

This arrangement of IOPN 300 enables input and output from any PN 100 in the arrays to any other PN 100 in the arrays after at most 5 Hops. An equivalent communication performance could also be achieved by an arrangement of the CPN 400 and the IOPN 300 along the other diagonal of the array.

FIG. 6e depicts the coupling between CPN 400 and the IOPN 300 of the first and second arrays. FIG. 6e omits the illustration of cross-coupling of processing nodes within the first 1004 and second 1006 arrays merely to reduce picture clutter and emphasize the interconnect between the first 1004 and second 1006 arrays.

In a first embodiment implementing the processing array, the AV engine 1000 comprises a two-dimensional array of processing nodes as depicted in figure 6a. A CPN 400 is positioned at the coordinates [0:0] and a plurality of IOPN 300 are positioned at the processing nodes [1:1 ,2:2,N-1 N-1]. The CPN 400 may comprise a pair of dual-CPU as depicted in figure 4c. As in previous embodiments, the CPN 400 operates under program control to perform load balancing of the remote client requests for AV content. The IOPN 300 in this embodiment may also comprise dual-CPU as previously depicted in FIG.4c. However, the preferred IOPN 300 in this and the previous embodiments comprises a pair of dual-CPU and at least an additional I/O CPU to interface with the Ethernet switch. See FIG. 6b.

Each pair of dual-CPU within the array of processing nodes may be coupled to the other pairs of dual-CPU using a variety of high-speed bi-directional communication technologies. Preferred communication technologies are based upon point-to-point traversal of the physical transport layers of the pairs of dual-CPU and may include a databus, fiber optics, and microwave wave guides. Such communication technologies may also include a messaging protocol supporting TCP-IP for example. Further embodiments support Wavelength Division Multiplex (WDM) communications through the physical transport layer coupling the pairs of dual-instruction set CPU.

In the preferred embodiment, the AV engine 1000 comprises a first 1004, and a second 1006, two-dimensional array of processing nodes as depicted in FIGS. 6c and 6d respectively. The first and second arrays situate a CPN 400 at each processing node designated by the coordinates [0:0] in each array. Further, a plurality of IOPN 300 are positioned at the processing nodes along the diagonal from the CPN 400 in each array, e.g. IOPN 300 are at the array coordinates designated by [1:1], [2:2], [N-1:N-1]. Moreover, the IOPN 300 of the first 1004 array is orthogonally coupled to its neighboring IOPN 300 in the second 1006 array. This arrangement of IOPN 400 enables input and output from any PN 100 in the arrays after at most 1 Hop, or to a specific IOPN in at most two Hops. An equivalent communication performance could also be achieved by an arrangement of the CPN 400 and the IOPN 300 along the other diagonal of the array. FIG. 6e depicts the preferred cross-coupling between CPN 400 and the IOPN 300 of the first and second arrays. FIG. 6e omits the illustration of cross-coupling of processing nodes within the first 1004 and second 1006 arrays merely to reduce picture clutter and emphasize the interconnect between the first 1004 and second 1006 arrays.

In this preferred embodiment, retrieval and processing of the AV content is performed by the PN 100 upon receipt of a request for Internet AV content forwarded from an IOPN 300. Like the previous embodiments, each PN 100 processing a remote client AV content request passes a I-frame to an IOPN 300, which in turn, formats the MPEG2 TS GoP that includes the PID expected by the remote client.

The delivery of multimedia content poses unique problems and is accorded special treatment by the AV Engine implementing the present invention. If at least a portion of the Internet AV content requested the remote client comprises multimedia content, the program controlling the PN 100 loads a software plug-in associated with the particular type of multimedia content requested. Thereafter, software plug-in controls the PN 100 to write the Internet Application background display content and the software plug-in writes a representation of the playback application window and associated user controls to the local memory device. Alternatively, a simple bitmap representation of the browser display screen can be prepared for remote client(s) that are incapable of decoding and displaying more than one MPEG2 window.

Figure 7A:
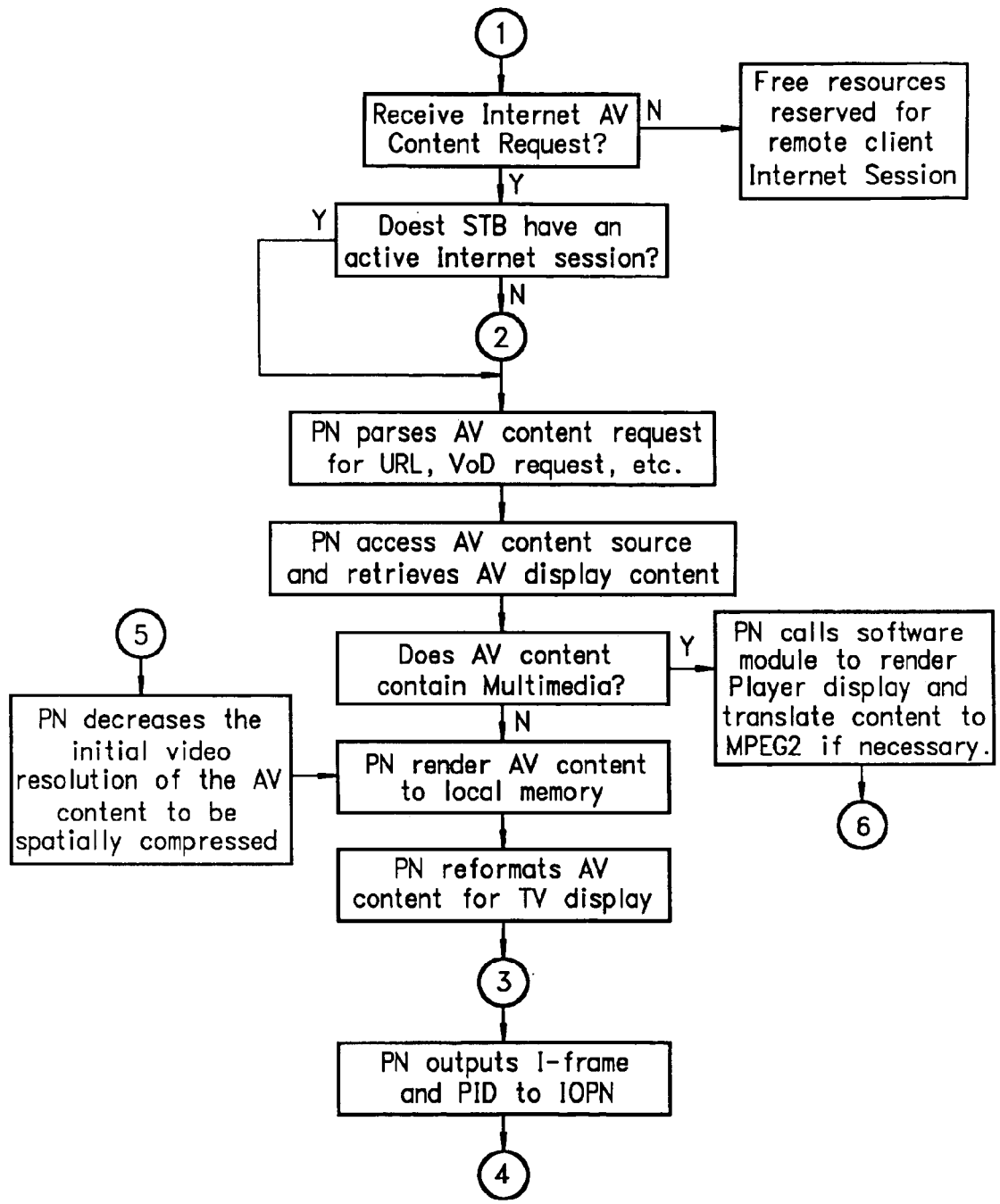
FIGS. 7a and 7b depict a flow diagram representing the operation of an embodiment of a Processing Node of the present invention.
Figure 7B:
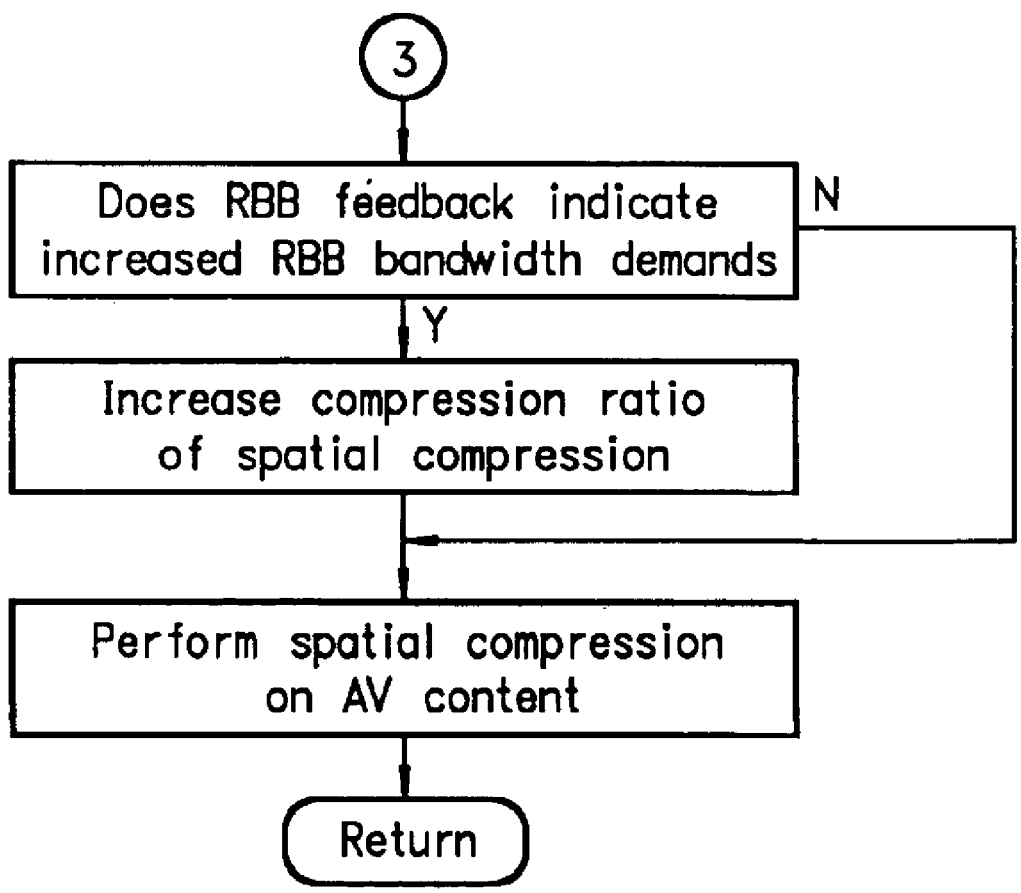
Figure 8:
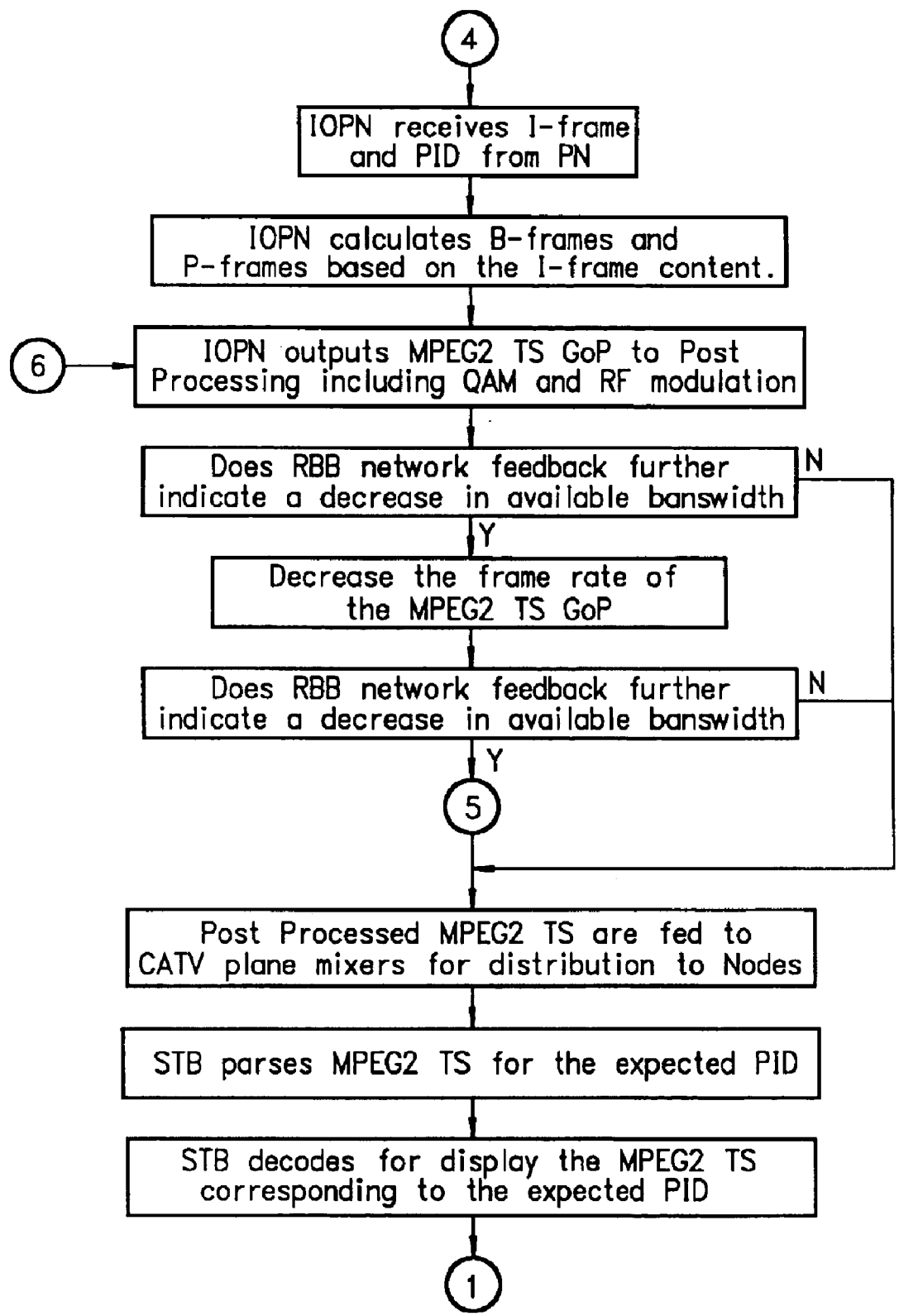
FIG. 8 depicts a flow diagram representing the operation of an embodiment of a Input Output Processing Node of the present invention.
Figure 9:
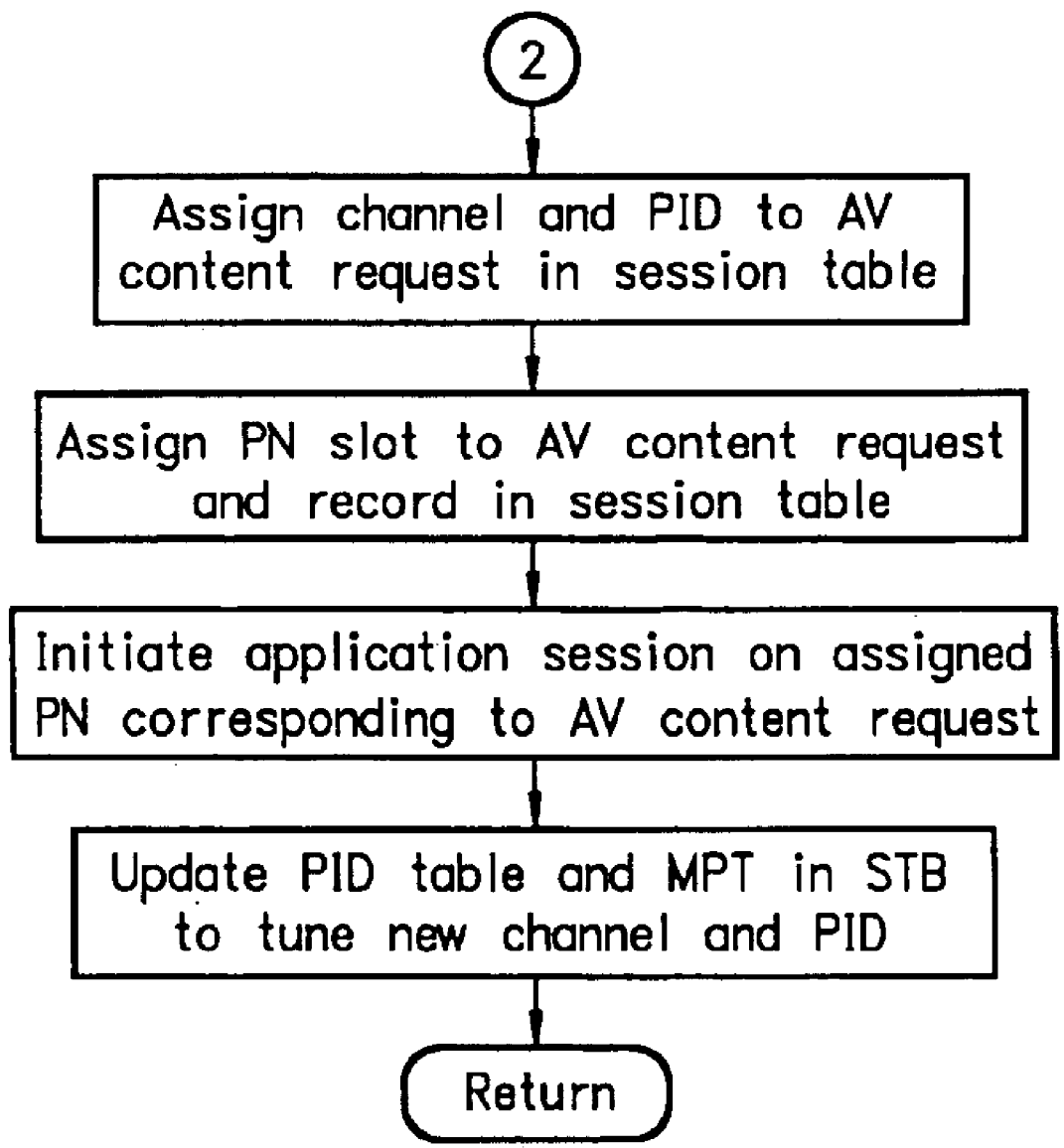
FIG. 9 depicts a flow diagram representing the operation of an embodiment of a Control Processing Node of the present invention.

Moreover, the PN 100 skips the inter-frame encoding operation. Instead, the MPEG multimedia content is delivered directly to the IOPN 300 with the PID which forwards it to the remote client unchanged. Else, if the multimedia content comprises non MPEG content, the IOPN 300 runs another program module to translate the non MPEG2 files into MPEG2 GoP data streams for display within the playback application window coordinates of the remote client. Further, to avoid an unnecessary duplicate retrieval and translation of recently requested multimedia content, the IOPN 300 software also checks to see if the requested multimedia file has been recently requested and is therefore available in cache to be directly output as an MPEG2 TS GoP to the remote client. FIGS. 7, 8, and 9 depict a representative flow of the method of the present invention implemented on the AV Engine described herein.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A method of delivering video content through a residential broadband network, comprising:
   receiving a request for video content from a remote client;
   establishing an application session on a first processor, and within the first processor,
      accessing a video content source to retrieve the requested video content;
      compressing the retrieved video content to create a spatially compressed frame of video content,
      signaling to a second processor of the existence of the spatially compressed frame of video content,
   and within the second processor;
      temporally, compressing the spatially compressed frame of video content to create at least one temporally compressed frame of video content;
      merging the spatially compressed frame at video content with the temporally compressed frame of video content to create a data stream of compressed video content;

outputting the data stream of compressed video content to the remote client;

wherein the first processor and the second processor each belong to at least one processing node within an N^M array of processing nodes, where N refers to the number of processing nodes within processing node row or column and is at least four and M least two, wherein each of the processing nodes are orthogonally coupled and support bi-directional communications between orthogonal processing nodes, and wherein each processing node comprises M*(N-1) communication ports that are coupled with the communication ports of the orthogonal processing nodes.

2. The method of claim 1 further comprising the step of, communicating a combination of a unique channel and Program Identifier that carries the data stream of compressed video content to the remote client.

3. The method of claim 2 wherein the spatially compressed frame of video content comprises an MPEG2 I-frame.

4. The method of claim 2 wherein
the at least one temporally compressed frame of video content comprises an MPEG2 B-frame.

5. The method of claim 2 wherein
the at least one temporally compressed frame of video content comprises an MPEG2 P-frame.

6. The method of claim 2 wherein
the data stream of compressed video content comprises an MPEG2 Transport Stream Group of Pictures.

7. The method of claim 1 wherein
the application session on the first processor comprises an Internet application session.

8. The method of claim 7 wherein
the Internet application session comprises a Internet Browser application session.

9. The method of claim 1 wherein the step of accessing a video content source to retrieve the requested video content further comprises,
accessing a switched network to retrieve the requested video content.

10. The method of claim 9 wherein
the switched network comprises the Internet.

11. The method of claim 1 wherein the step of accessing a video content source to retrieve the requested video content further comprises,
accessing a video-on-demand server to retrieve the requested video content.

12. The method of claim 1 wherein
the broadband network comprises a cable-television residential broadband network.

13. The method of claim 1 wherein the step of signaling to the second processor of the existence of the spatially compressed frame of video content comprises,
outputting from the first processor, the spatially compressed frame of video content, to the second processor.

14. The method of claim 1 wherein the step of signaling to the second processor of the existence of the spatially compressed frame of video content comprises,
depositing from the first processor to a memory location the spatially compressed frame of video content, and;
setting an update flag associated with the memory location.

15. A processing engine for the delivery of video content through a broadband network, comprising:
a first processor, that is under program control to, access and retrieve video content requested by a remote client through the broadband network, and spatially compress the retrieved video content to form a spatially compressed frame of the video content; coupled to a second processor, that is under program control to, temporally compress the spatially compressed frame of the video content to form a plurality of temporally compressed frames representing the video content, and merge the spatially compressed frame of the video content and the plurality of the temporally compressed frames of the video content to render a stream of compressed frames representing the video content and to output the stream to the remote client;

wherein the first processor and the second processor each belong to at least one processing node within an N^M array of processing nodes, where N refers to the number of processing nodes within a processing node row or column and is at least four and M refers to the number of orthogonal dimensions of the array of processing nodes and is at least two, wherein each of the processing nodes are orthogonally coupled and support bi-directional communications between orthogonal processing nodes, and wherein each processing node comprises M*(N-1) communication ports that are coupled with the communication ports of the orthogonal processing nodes.

16. The processing engine in claim 15 wherein,
bi-directional communication between processing nodes comprises traversal of the physical transport layers of the processing nodes.

17. The processing engine of claim 16 wherein,
the physical transport layer consists of a physical media selected from the group consisting of;
fiber-optics, a databus, twisted pair, or microwave wave guide.

18. The processing engine of claim 15 wherein
each processing node comprises at least a bi-directionally coupled pair of processing units.

19. The processing engine of claim 18 wherein
each processing unit comprises a bi-directionally coupled dual-CPU within the same package.

20. The processing engine of claim 18 further comprising,
a communications processing unit that is bi-directionally coupled to the processing units.

21. The processing engine of claim 15 wherein,
at least a portion of the processing nodes are each under program control to, exclusively access and retrieve through a switched network video content requested by a plurality of remote clients, and spatially compress the retrieved video content to form the spatially compressed frame of the video content.

22. The processing engine of claim 21 wherein,
at least one processing node performs a load balancing function to equally distribute the plurality of remote clients requests across the portion of processing nodes.

23. The processing engine of claim 15 wherein,
at least a portion of the processing nodes exclusively temporally compress the spatially compressed frames of the video content requested by the plurality of remote clients to form the plurality of temporally compressed frames representing the video content, and merge the spatially compressed frame of the video content and the plurality of the temporally compressed frames of the video content to render the stream of compressed frames representing the video content.

24. A processing engine architecture for use with the delivery of audio or video content over a broadband network, comprising:

an N^M array of processing nodes, where N is the number of processing nodes along M dimensions of the array of processing nodes; each processing node further comprising;

M*(N-1) communication ports that are bi-directionally coupled to the communication ports of orthogonally situated processing nodes.

25. The processing engine architecture in claim 24 wherein, at least a portion of the processing nodes further have at least an additional communication port that is connectable to an external switched network.

26. The processing engine architecture in claim 24 wherein, processing nodes are bi-directionally coupled using at least one physical media selected from the group consisting of, microwave wave guides, fiber, a databus.

27. The processing engine architecture in claim 24 wherein, communication between the processing nodes comprises traversal of the physical transport layer of the processing nodes.

28. The processing engine architecture in claim 24 wherein, at least a portion of the processing nodes comprise a pair of bi-directionally coupled processing units.

29. The processing engine architecture in claim 28 wherein, the bi-directionally coupled processing units comprise dual-CPU within the same physical package.

* * * * *